United States Patent Office 3,340,211
Patented Sept. 5, 1967

3,340,211
PROCESS FOR MODIFYING POLYAMIDES WITH AN ALKYLATING AGENT IN AN ORGANIC SOLVENT AND A NITROGEN BASE
Albert Eschenmoser, Zollikon, Rolf Scheffold, Zollikerberg, Erhard Bertele, Zurich, Mario Pesaro, Kusnacht, and Hans Heinrich Bosshard, Binningen, Switzerland, assignors to Ciba Limited, Basel, Switzerland, a Swiss company
No Drawing. Filed Feb. 17, 1964, Ser. No. 345,082
Claims priority, application Switzerland, Feb. 22, 1963, 2,261/63
11 Claims. (Cl. 260—9)

It has been found that polyamides can be modified in a valuable manner by reacting them with strongly reactive alkylating agents and reacting the resulting polyimino ester salts with nitrogen bases that contain at least one HN= group.

For the above-mentioned reaction any desired polyamide may be used, for example those from ε-caprolactam or from adipic acid and hexamethylenediamines or from the lactam of aminoundecanecarboxylic acid. They may be used in various forms, for example as powders, chips or foils. Particularly valuable results are as a rule obtained with polyamide fibers.

Suitable strongly reactive alkylating agents are, for example, alkylsulfates containing lower alkyl groups, such as diethylsulfate or dimethylsulfate. In view of their good reactivity the trialkyloxonium salts are preferred, especially those which contain lower alkyls. As relevant examples there may be mentioned the oxonium salts which contain, on one hand, the cation of the formula (1) 

where $R_1$, $R_2$ and $R_3$ represent equal or different alkyls, such as methyl or ethyl, and on the other hand contain an anion from one atom of a polyvalent metal and a number of halogen atoms greater by 1 than the valency of the metal, such as $FeCl_4^{\ominus}$, $SbCl_6^{\ominus}$ and above all $BF_4^{\ominus}$ and $AlCl_4^{\ominus}$. As is known, these oxonium salts can be prepared from epihalohydrins and metal halide ether complexes.

The reaction of the polyamide with the trialkyloxonium salt is advantageously carried out in an inert organic solvent. Good results have been obtained with chlorinated hydrocarbons, for example a chlorobenzene such as monochlorobenzene, a di- or trichlorobenzene or with aliphatic chlorinated hydrocarbons such as trichloroethylene, chloroform, and also with carbon tetrachloride, and especially with nitrobenzene. The proportions in which the two reactants are to be used may vary within wide limits, though it is in general advantageous to proceed so that only some of the carboxylic acid amide groups of the polyamide participate in the reaction with the oxonium compounds. Thus, for example polyamide, especially in the fibrous form, may be treated in one of the said solvents that contain per liter 0.01 to 0.5 mol of the oxonium compound, advantageously limiting the time of reaction to from a few minutes to one hour, and working at room temperature or a slightly elevated temperature, for example up to about 40° C. Particularly good results are obtained when the fibrous material is impregnated, for example on a padder, with a solution of the oxonium compound in an organic solvent and then, without intermediate drying, subjecting it to a dry heat treatment, advantageously at a temperature ranging from 100 to 150° C., for ½ to 5 minutes. It will be readily understood that the number of groups entering the reaction is increased when the concentration and/or the reaction temperature is increased and/or the reaction time is extended. For this reason it is of advantage, when the reaction is performed in a liquid medium, to remove the excess of oxonium compound timely from the polyamide, for example by washing the fibrous material (after it has been taken out of the reaction solution) with the solvent, or by immediately thereafter reacting the product obtained with the nitrogen base.

The reaction of the polyamide with the oxonium compound may be represented thus:

(2) 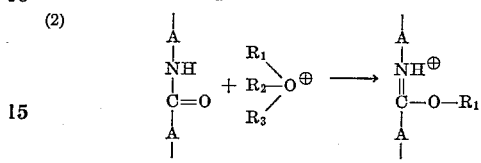

where A represents an alkylene radical and $R_1$, $R_2$ and $R_3$ each stands for an alkyl radical. Accordingly, the reaction products from the polyamides with the trialkyl oxonium salts may be looked upon as polyimino ester salts that contain in addition to structural elements of the formula (3) 

structural elements of the formula (4) 

where A represents an alkylene group and $R_1$ a preferably lower alkyl radical.

According to the present invention these polyimino ester salts are reacted with nitrogen bases that contain at least one basic HN= group. A wide variety of nitrogen bases of this kind may be used, for example inorganic bases such as ammonia, hydroxylamine or hydrazine. As suitable organic bases there may be mentioned, for example:

Mono-, di- and polyamines containing at least one primary or secondary amino group, such as monoalkylamines and dialkylamines; alkylenediamines, especially ethylenediamine; polyalkylene-polyamines such as diethylenetriamine or triethylenetetramine; mono-, di- or trialkylhydrazines such as N:N-dimethylhydrazine; hydroxyamines such as monoethanolamine or diethanolamine; aminocarboxylic acids such as aminoacetic acid (glycocol); aminosulphonic acids such as taurine or methyltaurine or 1-aminobenzene-3- or -4 sulfonic acid.

In a special variant of the present process the polyimino ester salts are reacted with dyestuffs that contain at least one basic HN= group; this process yields colored polyamides and the dyestuffs are bound by a covalent bond to the polyamides. Apart from the fact that the dyestuffs used must contain the afore-mentioned group, they may belong to widely differing classes. Aminoazo dyestuffs and aminoanthraquinones deserve special mention in this connection. The dyestuffs may, but need not, contain acid solubilizing groups, such as carboxylic acid or sulfonic acid groups.

The reaction of the polyimino ester salt with the basic nitrogen compound is performed, for example, in water or in an organic solvent, for example in a lower aliphatic alcohol such as methanol, ethanol or tertiary butanol. Particularly good results are obtained in many cases by using non-polar organic solvents, such as trichloroethylene, carbon tetrachloride or chloroform. This reaction is likewise advantageously carried out at room temperature or at a slightly higher temperature, for example ranging from 20 to 50° C. The duration of the reaction is advantageously within the range from one minute to one hour. In this reaction it is likewise of advantage to wash out the unreacted reagent, more especially so when a dyestuff containing amino groups has been used.

The reaction of the polyimino ester salt with the primary nitrogen base may be represented thus:

(5)
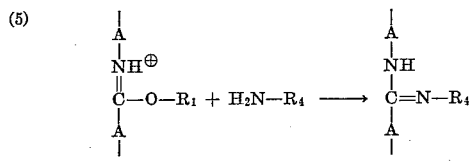

where A represents an alkylene radical and $R_4$ a hydrogen atom or a preferably organic radical.

The products of the above-described process are new. They may be looked upon as polyamidines containing in addition to structural elements of the formula (6) 

structural elements of the formula (7) 

where A represents an alkylene group and $R_4$ a hydrogen atom or a preferably organic radical.

By the treatment according to this invention the properties of the polyamides can be modified in various respects, and this modification may take different forms depending on the nitrogen compound chosen and the degree to which the reaction is taken. Thus, for example, the mechanical properties and/or the water-absorption or wettability can be varied. Thus, for example, the polyimino ester salts can be reacted with amines that contain higher alkyls, such as dodecyl or octadecyl groups, whereby a hydrophobic effect is produced. The opposite effect, which may be called hydrophilization, can be achieved by reaction with amines that contain a plurality of hydroxyl groups or polyglycol radicals. By reaction with amines that contain acid solubilizing groups, such as carboxylic acid or sulfonic acid groups, or with amines that contain in addition to the reactive amino group at least one quaternary ammonium group, the treated fabric may be rendered anti-static.

Furthermore, it is possible to increase the fixing capacity for various improving agents, such as optical brighteners or ultraviolet filters. In particular, the possibility of dyeing the polyamides with acid wool dyestuffs (which is insufficient with a large number of this type of dyestuffs) can be substantially improved according to this invention by treatment with basic nitrogen compounds, more especially diamines and polyamines. Inter alia, the polyamide fibers can be modified so that they can be dyed deep, fast shades with acid wool dyestuffs that hardly dye this material by the usual dyeing methods, without need for any special measures, such as using a temperature exceeding 100° C. Dyeing may also be carried out with reactive dyestuffs, especially those which contain chlorotriazine or chloropyrimidine radicals. In the case of polyimino ester salts treated with aminocarboxylic or aminosulfonic acids the affinity towards basic dyestuffs is increased. Furthermore, there may be formed metal complexes from the modified fibers and the dyestuffs.

Since the above-mentioned processes for improving the polyamide fibers require the introduction of certain organic radicals, which are bound thereby by a covalent bond to the polyamide, a lasting effect is achieved which is very resistant towards the conditions which usually attend the use and cleaning of the fibrous material.

*Example 1*

A commercial fabric from polyamide fibers (manufactured from hexamethylenediamine and adipic acid) is immersed for 30 minutes at room temperature in a 0.1-molar solution of triethyloxonium tetrafluoborate in chloroform. The fabric is then taken out of the bath, expressed and, without intermediate drying, introduced in a 0.1-molar solution of ethylenediamine in methanol, where it is kept for 15 minutes, then taken out, rinsed with methanol and dried. The polyamide modified in this manner can be dyed much more easily and deeper with acid wool dyestuffs shades than the starting fabric.

Instead of adopting the procedure described above, the polyamide fiber fabric may be impregnated on a padder with a solution of triethyloxonium tetrafluoborate in nitrobenzene and then subjected to a heat treatment at 120° C. The reaction with ethylenediamine may alternatively be carried out in chloroform.

*Example 2*

A polyamide fabric of the type described in Example 1 is treated for 20 minutes at 40° C. in a 0.05-molar solution of triethyloxonium tetrafluoborate in chloroform and then, without intermediate drying, moved about for 5 minutes in a 0.5% solution of meta-aminoazobenzene in methanol, and then washed with methanol. The fabric is dyed a strong yellow shade. A polyamide fabric, which for comparison has been treated with the identical dyestuff solution, but without preliminary reaction with oxonium salt, remains practically colorless.

*Example 3*

The procedure is as described in Example 2, except that the solution of meta-aminoazobenzene is replaced by a solution of the dyestuff of the formula

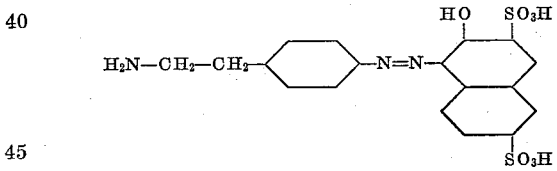

whereby an intense scarlet shade is produced. When the preliminary reaction with the oxonium salt is omitted, the polyamide treated with the dyestuff remains almost colorless.

*Example 4*

A dyebath is prepared which contains in 4000 parts of water 4 parts of acetic acid of 40% strength and 2 parts of the dyestuff of the formula

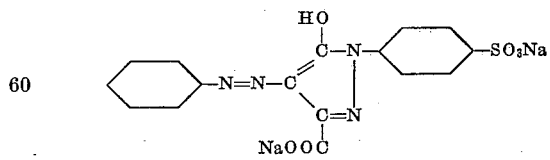

100 parts of polyamide fabric are treated as described in Example 1 and then immersed in this bath at 45° C. which is then raised to 95 to 100° C. and kept at this temperature for one hour. The polyamide is then rinsed in cold water and dried. It displays an intense yellow shade. Polyamide that has not been modified is only very faintly tinted by this method.

Strong dyeings are obtained by this dyeing method on polyamide modified according to Example 1 also with the dyestuffs of the following formulae which only faintly color polyamide that has not been modified.

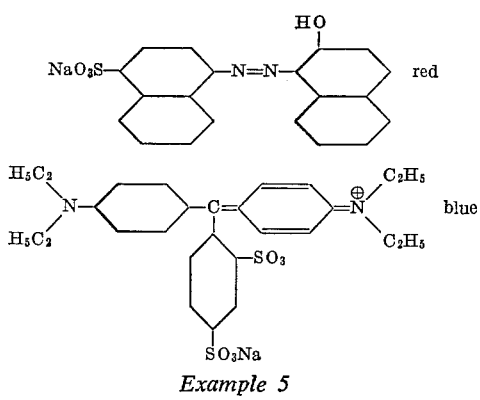

Example 5

A polyamide fabric from nylon (staple fibers) is padded with a 10% solution of triethyloxonium tetrachloroaluminate in nitrobenzene and squeezed to a weight increase of 75%. The impregnated fabric is then exposed in the wet state to a heat treatment for 1 minute at 120° C. in an air passage.

The fabric is then treated for 15 minutes at 20 to 25° C. in a 30% solution of n-dodecylamine in chloroform, and then soaped at 40° C. with a solution containing 0.3% of a non-ionic detergent. After having been rinsed and dried, the fabric displays distinctly hydrophobic properties.

Example 6

A polyamide fabric from nylon (filament) is padded with a 20% solution of triethyloxonium tetrafluoborate in nitrobenzene and then subjected to the heat treatment described in Example 5.

The fabric is then treated with an aqueous 30% solution of glucamine for 15 minutes at 20 to 25° C. After having been finished off as described in Example 5, the fabric is more readily wettable than untreated polyamide.

Example 7

A fabric made from nylon filament is padded with a solution of 20% strength of triethyloxoniumfluoborate in nitrobenzene. Wound up together with a polyvinyl chloride foil it is subjected to a dry heat treatment for 5 minutes at 120° C. The fabric is there rinsed with chloroform and treated for 15 minutes in a solution of 30% of the compound of the formula

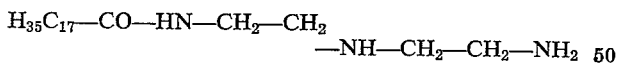

in chloroform. Then the fabric is rinsed twice with chloroform, soaped at 50° C. with an aqueous solution containing a non-ionic detergent, rinsed with water and extracted with dioxane in the hot.

By this treatment an antistatic finish which is fast to solvents and washing is obtained.

What is claimed is:

1. A process for modifying shaped polyamides which comprises impregnating a shaped polyamide containing —A—CO—NH—A— elements wherein A represents an alkylene radical with
   (1) a solution of a strongly reactive alkylating agent selected from the group consisting of lower alkyl sulfates and trialkyl oxonium salts in an inert organic solvent in an amount of 0.01 to 0.5 mol per liter to form a polyiminoester salt and then
   (2) a solution of a nitrogen base containing at least one basic —NH-group to form a polyamidine.

2. A process according to claim 1 wherein the alkylating agent is a lower trialkyl oxonium salt.

3. A process according to claim 2 wherein the lower trialkyloxonium salt is a lower trialkyloxonium tetrafluoborate.

4. A process according to claim 2 wherein the lower trialkyloxonium salt is a lower trialkyloxonium tetrachloroaluminate.

5. A process according to claim 1 wherein the nitrogen base is ethylenediamine.

6. A process according to claim 1 wherein the nitrogen base is a dyestuff containing a primary amino group.

7. A process according to claim 1 wherein the nitrogen base is a primary higher alkylamine.

8. A process according to claim 7 wherein the primary higher alkylamine is n-dodecylamine.

9. A process according to claim 1 wherein the nitrogen base is a primary amine with a plurality of hydroxyl groups.

10. A process according to claim 9 wherein the nitrogen base is glucamine.

11. The product formed according to the process of claim 1.

References Cited

UNITED STATES PATENTS

| | | | |
|---|---|---|---|
| 2,801,190 | 7/1957 | Orthner et al. | 260—78 |
| 2,855,267 | 10/1958 | Zimmerman | 260—78 |
| 2,989,364 | 6/1961 | Goldann | 260—78 |

WILLIAM H. SHORT, *Primary Examiner.*

H. D. ANDERSON, E. M. WOODBERRY,
*Assistant Examiners.*